March 21, 1933.     W. F. GRANT     1,901,961
ROTARY VALVE
Filed Jan. 19, 1932     2 Sheets-Sheet 1
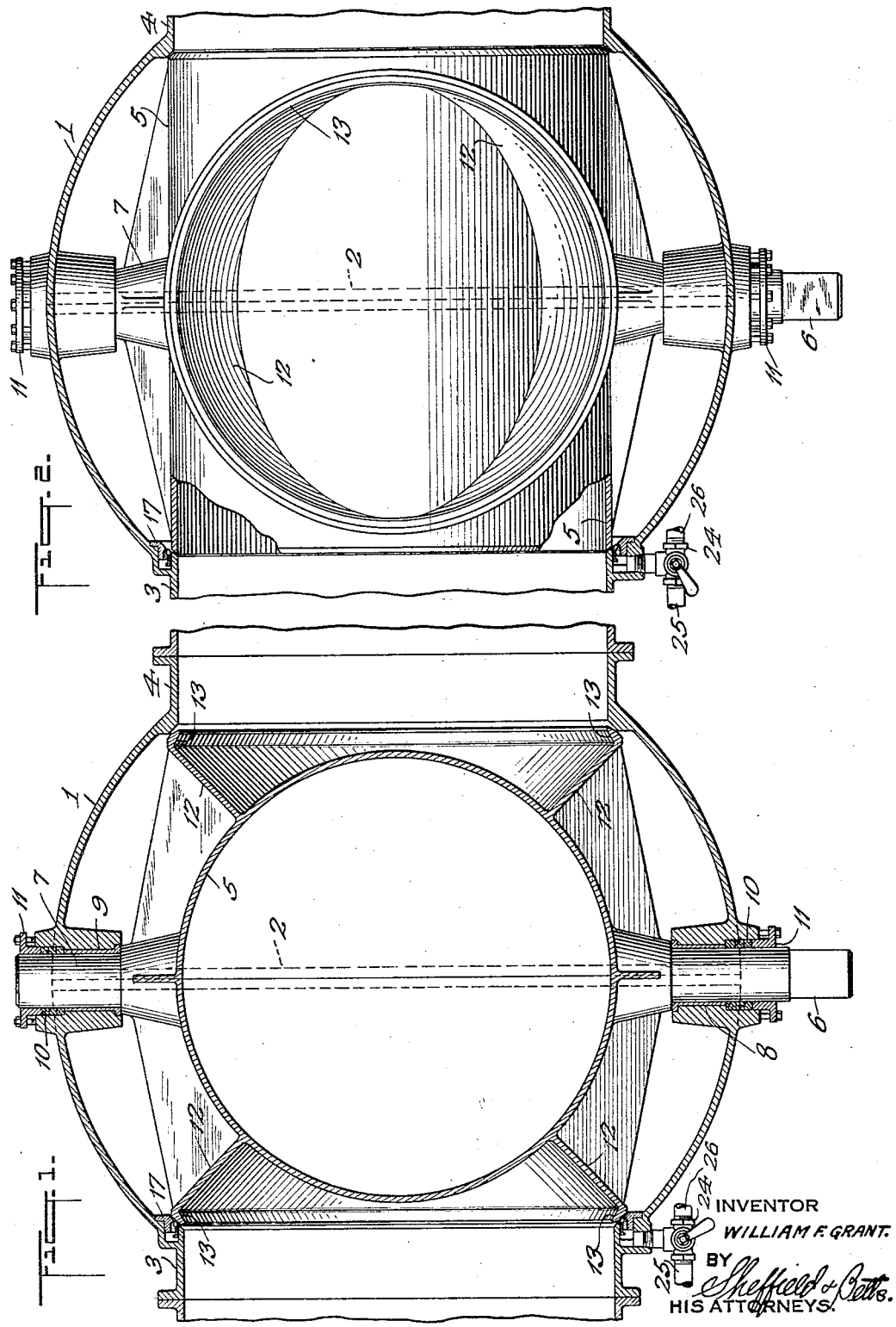
INVENTOR
WILLIAM F. GRANT.
BY
HIS ATTORNEYS.

March 21, 1933. W. F. GRANT 1,901,961
ROTARY VALVE
Filed Jan. 19, 1932 2 Sheets-Sheet 2
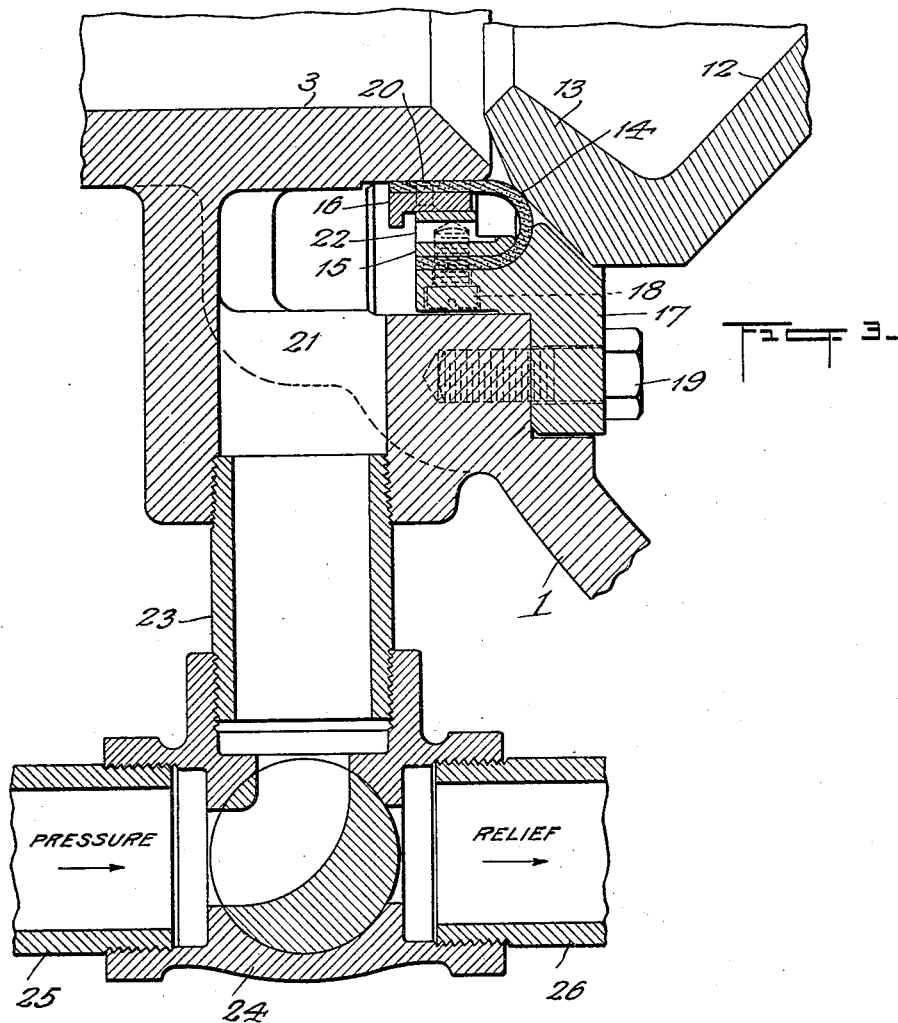
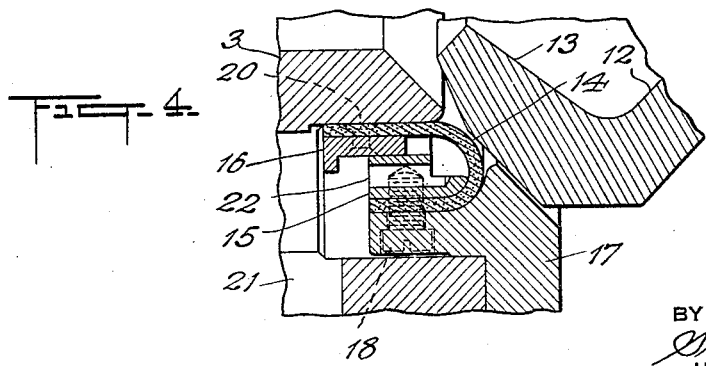
INVENTOR
WILLIAM F. GRANT.
BY Sheffield & Betts
HIS ATTORNEYS.

Patented Mar. 21, 1933

1,901,961

UNITED STATES PATENT OFFICE

WILLIAM F. GRANT, OF NEWPORT NEWS, VIRGINIA, ASSIGNOR TO NEWPORT NEWS SHIPBUILDING AND DRY DOCK COMPANY, A CORPORATION OF VIRGINIA

ROTARY VALVE

Application filed January 19, 1932. Serial No. 587,459.

This invention relates to rotary valves for controlling the flow of any fluids, such as liquids or gases, and is especially adapted for use in connection with waterways, the penstocks for hydraulic turbines, irrigation systems, and water and oil mains.

This invention more especially comprises a pressure type sealing device for rotary valves, which will prevent leakage when such a valve is closed. When the pressure applied to the sealing device is relieved, the valve may be easily opened on account of movable parts being free from any friction caused by the sealing device of my invention.

The object of this invention is to provide a valve that is leak-proof, and one that is so arranged that it can be easily operated, either manually or by power, and at the same time the new parts provided therewith will not reduce the area of the water passage or restrict the flow of water through the waterway while the valve is open.

A further object of this invention is to provide a small amount of clearance between the rotating cylinder and the valve housing when the valve is open, so that no solid material can pass through or lodge between the walls of the rotating cylinder and the valve housing.

A rotating tubular section or hollow cylinder moves about an axis at right angles thereto and to the center line of the valve seats. The valve housing is preferably made in substantially spherical form and is provided with bearings for trunnions that are integral with and which extend from the rotatable cylinder.

The construction of this improved valve is such that it is suitable for hand or for power operation, and the means for producing the sealing action may be operated either by hydraulic pressure from the penstock, or from other sources of fluid pressure.

For a detailed description of one form of my invention which I at present deem preferable, reference may be had to the following specification and to the accompanying drawings forming a part thereof, in which Fig. 1 is a sectional view taken axially and through the trunnions which support the rotatable cylinder.

Fig. 2 is a similar view, but showing the rotatable cylinder at right angles to its position as shown in Fig. 1;

Fig. 3 is an enlarged sectional view of the means and passages which are provided to operate the sealing portion of the improved valve; and Fig. 4 is a view similar to Fig. 3, showing the sealing device withdrawn from its opposed part.

In the drawings, the numeral 1 indicates a housing, which is preferably made in substantially hemispherical halves which are bolted or otherwise secured together by means of flanges 2, indicated by dotted lines in Figs. 1 and 2. Such hemispherical halves are also provided with cylindrical portions 3 and 4, forming intake and outlet ports or passages for the valve, and which communicate with the penstock and the discharge conduit. The diameters of the inlet and outlet passages or ports are preferably of the same diameter as that of the penstock. The rotatable cylinder 5 is provided with trunnions 6 and 7, on each side thereof, that rotate in composition bearings 8 and 9. One of the trunnions, such as 6, may be provided with suitable means for rotating the cylinder 5, such as a hand wheel or gear (not shown). Each bearing is provided with a packing box 10, and the packing is held in position therein under pressure by means of glands 11. Carried on opposite sides of the rotating cylinder 5 are projecting flanges 12, which are provided at their outer margins with inwardly turned portions or flanges 13, which are adapted to cooperate, when the valve is closed, with the sealing device, hereinafter described. These inwardly turned portions or flanges 13 are substantially circular in shape, as indicated in Fig. 2, and either one is adapted to lie opposite the ends of the cylindrical portions 3 and 4 with suitable clearance when the rotatable valve member is in position for closing the valve.

The cylindrical portion 5 of the rotatable valve member is preferably U-shaped in cross-section and is provided with a beveled edge, as indicated more clearly in Fig. 2, so that there is sufficient clearance between it and a corresponding beveled edge on the cylindrical portions 3 and 4, to avoid friction between said edges. This clearance is not only sufficient to allow free movement of the rotatable valve member, but also is small enough to prevent the passage of solid material therethrough so that the same cannot lodge between the walls of the rotating cylinder and the housing.

At the inlet end of the housing, there is provided a sealing device comprising a ring 14 preferably of flexible waterproof material such as rubber, leather or fabric, although other flexible materials may be used, to provide a sealing joint between said housing and the closure for the rotary valve. One margin of the ring 14 is held in place on the housing by the ring 15, and the other margin is held movably in position by the ring 16 slidably located in a suitable cylindrical recess in the housing. The ring 15 is attached to the ring 17 by any suitable means, such as the screws or bolts 18 which pass through said ring 14 and the ring 17, which in turn is affixed to the housing by the bolts 19. The ring 16 is secured to one margin of the seal ring 14 by means of rivets 20, and said ring has a clearance sufficient to allow a sliding motion between the same and the ring 15 and also between the ring 14 and the surface of the housing within which it is placed.

It will thus be seen that since the ring 16 is slidable toward the right or left within the housing, the flexible portion, 14, thereof may be forced to the right to contact with the projecting flange 13 or may be forced away from the projecting flange 13, as indicated in Figs. 3 and 4 respectively. The flexible seal ring 14 and the ring 16 slide along their adjacent surfaces when pressure is applied from the chamber 21 through a plurality of ports such as indicated at 22. Such pressure is applied to the chamber 21 through a pipe connection 23, which communicates with a controlling valve 24 adapted to be turned so that the rotatable part thereof will assume two or more positions. A pipe 25 is connected with any suitable source of fluid pressure, such as with the penstock, before it enters the rotary valve previously described. Said controlling valve also has an outlet port or conduit 26, which discharges to any suitable point having practically atmospheric pressure.

It will now be seen that when the rotatable valve member 5 is in the position shown in Fig. 1 to close the valve and the rotatable member of the valve 24 is at the angle indicated in Fig. 3, fluid pressure will be supplied to the chamber 21 and to the passages 22, and a fluid pressure is thereby created at one side of and within the flexible sealing ring 14. This will tend to force the said sealing ring 14 and the ring 16 toward the right and produce a substantially fluid tight contact or seal with the flange 13.

When it is desired to allow the flexible sealing ring 14 to move toward the left, to open the rotary valve, the valve 24 is turned to the proper angle so that the pipe 23 communicates with the pipe 26, thereby relieving the pressure within said chamber 21 and leaving the rings 14 and 16 free to move toward the left. This is ensured by reason of the fact that the pressure through the inlet port 3 from the penstock will act upon the surface of the flexible packing 14 and force the same toward the left, leaving a suitable clearance as shown in Fig 4. It is obvious that the production of the pressure and its relief in the chamber 21 and the ports 22 may be accomplished by two independent valves instead of a single valve, but the use of a single valve is more simple and can be used to advantage when said valve 24 is intended to be operated automatically through the motion of another part employed to operate the main rotary valve above described.

From an examination of the above-described construction, it will be appreciated that since the closure and sealing portion of the valve operates in connection with its inlet passage or port, the main portion of the interior of the valve housing will be free from liquid and from the consequent pressure thereof on its walls, when the valve is closed. It will also be appreciated that the movable parts are of a minimum number and of a minimum weight, and are therefore without substantial inertia.

I do not wish it to be considered that this invention is limited to the details of design and specific arrangement of parts set forth above in connection with the present illustration of my invention, for various changes may be made by those skilled in the art, without departing from the spirit and scope thereof.

What I claim and desire to protect by Letters Patent, is:

1. In a rotary valve having a housing and a tubular valve member rotatable on a transverse axis within said housing, the improvement which comprises a sealing device including a flexible sealing ring of thin sheet material surrounding a passage in said valve, means for holding one margin of said flexible ring in position, and means for moving the opposite margin of said flexible ring transversely, to cause the central portion of same to contact under pressure with its opposed part.

2. In a rotary valve having a housing and a tubular valve member rotatable on a transverse axis within said housing, the improvement which comprises a sealing device including a flexible sealing ring of thin sheet material surrounding a passage in said valve, a fixed ring for holding one margin of said flexible ring in position, and a slidable ring to which the opposite margin of said flexible ring is attached and adapted to move said flexible ring transversely to cause the same to contact under pressure with its opposed part.

3. In a rotary valve having a housing and a tubular valve member rotatable on a transverse axis within said housing, the improvement which comprises a sealing device including a flexible sealing ring of thin sheet material surrounding a passage in said valve, a fixed ring for holding one margin of said flexible ring in position, a slidable ring to which the opposite margin of said flexible ring is attached for moving a portion of said flexible ring transversely to cause the same to contact under pressure with its opposed part, said housing having a passage communicating with one side of said flexible ring, and means to cause pressure on said flexible ring, to move the same transversely.

4. In a rotary valve having a housing and a tubular valve member rotatable on a transverse axis within said housing, the improvement which comprises a sealing device including a flexible sealing ring of thin material bent to have substantially concentric margins and surrounding a passage in said valve, means for holding one margin of said flexible ring in position, means for moving the opposite margin of said flexible ring transversely to cause the central portion of the same to contact under pressure with its opposed part, said housing having a passage communicating with one side of said ring, a conduit communicating with said passage, means connected with said conduit for supplying pressure to said passage and for releasing the same.

5. In a rotary valve having a housing and a tubular valve member rotatable on a transverse axis within said housing, the improvement which comprises a sealing device including a flexible sealing ring substantially U-shaped in cross-section surrounding a passage in said valve, means for fixing one margin of said flexible ring in position on said housing, a slidable ring for moving the opposite margin of said flexible ring transversely to cause the curved portions of the same to contact under pressure with its opposed part, a passage in said housing communicating with one side of said flexible ring, a conduit communicating with said passage, and a valved device in said conduit for conducting fluid pressure to said passage, and for releasing the same.

Signed this 14th day of January, 1932.

WILLIAM F. GRANT.